Aug. 26, 1952 R. A. GARRISON 2,608,263
POWER STEERING BOOSTER
Filed Dec. 22, 1949 4 Sheets-Sheet 2

INVENTOR
ROBERT A. GARRISON

BY Westall & Westall
ATTORNEYS

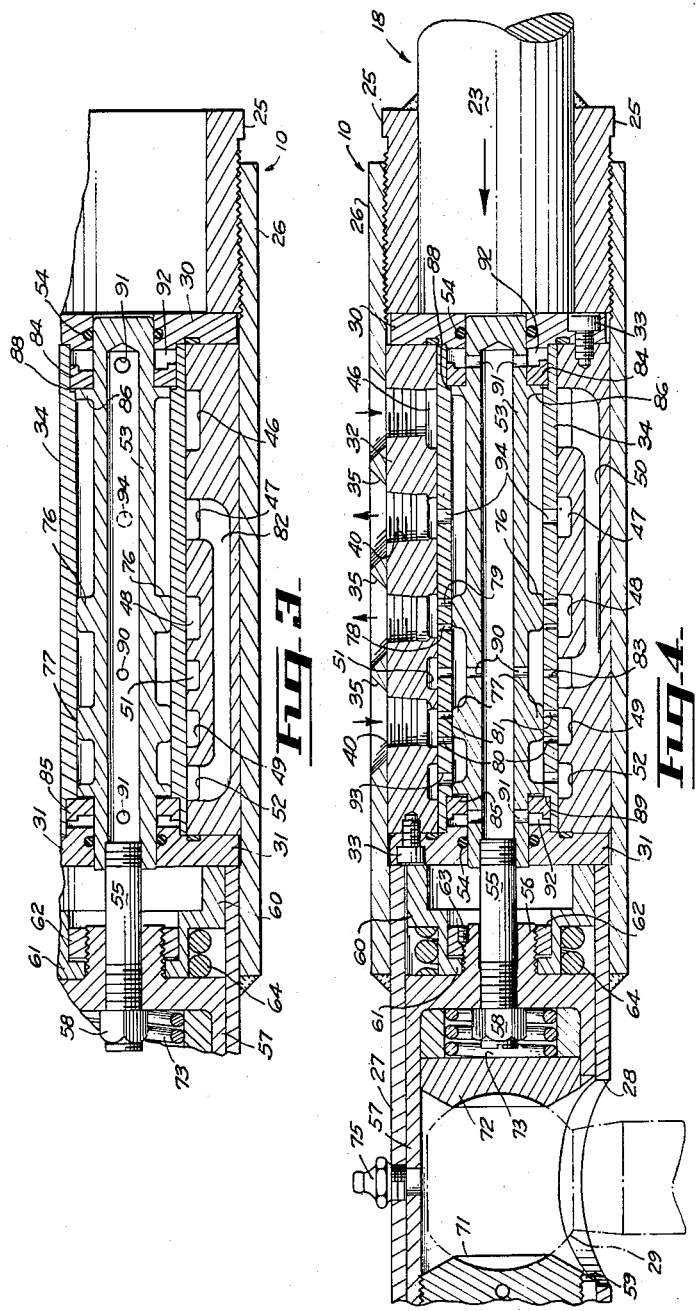

INVENTOR
ROBERT A. GARRISON
BY Westall & Westall
ATTORNEYS

Patented Aug. 26, 1952

2,608,263

UNITED STATES PATENT OFFICE 2,608,263

POWER STEERING BOOSTER

Robert A. Garrison, San Marino, Calif.

Application December 22, 1949, Serial No. 134,490

9 Claims. (Cl. 180—79.2)

This invention relates to power steering boosters for self-propelled vehicles and more specifically contemplates apparatus actuated by manually operable valvular mechanisms by which hydraulic power is utilized for directional control of the vehicle. Hydraulic steering boosters of the prior art adapted for actuation and control by the steering wheel of a vehicle comprises generally a fluid motor usually consisting of a piston-cylinder assembly actuated by hydraulic fluid, the flow of which is controlled by valve mechanism connected with the steering wheel of the vehicle. In accordance with such prior constructions, the motor and valve control are integrally connected and adapted for installation either in the drag link or at the base of the steering shaft. As a result road shocks are transmitted through the steering linkage before absorption by the power cylinder and piston assembly, and in constructions wherein the fluid motor and valve are integral, such shock places excessive stress upon the valve elements, steering gear housing or frame mountings.

While it is highly desirable that the resistance presented by the roadbed to the wheels or other steered parts in maintaining any desired preadjustments or in effecting directional change, should be transmitted in part to the steering wheel of the vehicle in order to facilitate response by the driver to varying road conditions, the actual transmission of such resistance either in whole or in part through the steering linkage is conducive to mechanical failures.

It is, therefore, a principal object of the present invention to provide a hydraulic steering booster adapted for utility and application to motor graders, trucks, truck cranes, wheel-type tractors, or the like, comprising essentially a double acting hydraulic cylinder adapted for direct connection to the steered wheels or other parts of the vehicle and supplied with hydraulic power controlled by valve mechanism assembled in the drag link, whereby the valve assembly is in proximate association with its manually operable motivating force and the power of the system is applied directly to the work.

More specifically, an object is to provide a four-way valve connected to a source of fluid under pressure and to a reservoir tank for the continuous circulation therethrough of the fluid, in combination with means for diverting the flow into, selectively, either end of a power cylinder to actuate the piston therein, the cylinder being normally in open communication with the circulating system whereby the normal caster of the steered wheels is permitted to return the latter to forward, intermediate alignment and to correspondingly reposition the piston for subsequent activation.

Another and highly important object is the provision of dual means for returning the valve to a neutral or inoperative position, comprising essentially normally balanced resilient elements arranged in opposition to one another, the balance of which is upset incident to operative adjustment of the valve, and fluid pressure elements actuated by the hydraulic circulating system, each of the two components of the composite mechanism being individually and jointly operable to produce a pre-determined measure of resistance to manual adjustment of the valve.

Still another and related object is the provision of a telescopic control valve comprising a pair of pressure actuated rings operable to normally bear against the complementary ends, respectively, of the telescopically related valve elements in response to pressure of the hydraulic system, relative longitudinal movement between the valve elements being effective to concentrate the pressure of the rings upon the extended ends of the individual elements, so as to utilize the pressure of the system for returning the valve to a neutral or normal position and induce a resistance against manual adjustment of the valve proportionate to the resistance of the load.

Numerous other objects and salient features of my invention such, for example, as relative economy of manufacture, ease of installation, simplicity of construction and adaptability and application to numerous types of mobile units, will be apparent to those of skill in the art upon an examination of the following description read in the light of the accompanying drawings, in which:

Fig. 3 is a fragmentary longitudinal section taken in a different plane from that of Fig. 1 illustrating the outlet passage formed in the valve cage;

Fig. 4 is a longitudinal section through the control valve depicting the valve elements in an extreme position in response to the thrust of an actuating force applied to the direction of the arrow;

Figure 1:
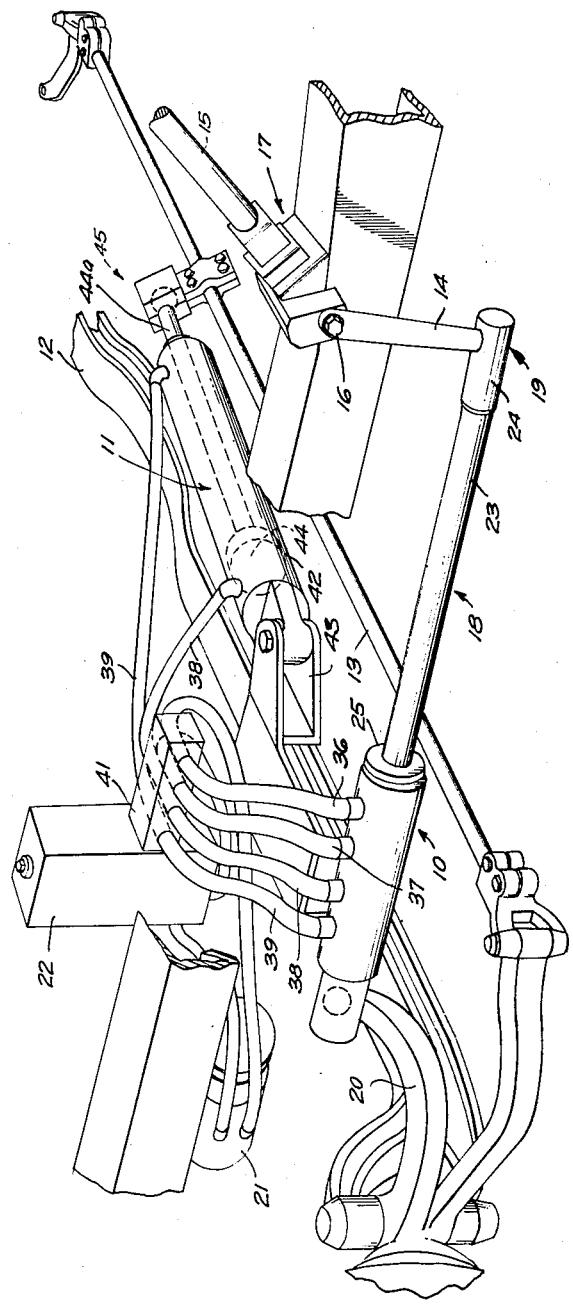
Fig. 1 is a perspective view of a preferred embodiment of my invention, illustrating a typical installation.

Referring more particularly to the drawings, wherein like numerals indicate similar parts throughout the several views, it will be appreciated that the particular installation of the invention herein contemplated and depicted in Fig. 1 is only illustrative of one application of a preferred embodiment hereof. In accordance therewith, and with particular reference to Fig. 1, my invention contemplates essentially a hydraulic telescopic valve 10 adapted for interposition in a composite drag link 18 of the vehicle for controlling the flow of hydraulic fluid to a double acting power cylinder-piston assembly generally indicated at 11 and connected between the axle 12 of the vehicle and a tie rod 13. The valve 10 is actuated and controlled incident to longitudinal movement of the drag link, which movement is imparted thereto by a pitman arm 14 connected to the steering shaft 15 of the vehicle by a lateral shaft 16 through conventional worm reduction gearing generally indicated at 17. Rotation of the steering wheel (not shown) of the vehicle thus swings the pitman arm 14 arcuately forward or backward depending upon the direction of rotation of the wheel in accordance with conventional construction and operation. The rear end of the drag link 18 is connected to the pitman arm 14 by a ball and socket joint indicated in Fig. 1 at 19. Correspondingly, the forward end of the drag link 18 is connected to the steered parts of the vehicle by the usual linkage which includes a steering arm 20 and the tie rod 13, above-referred to.

A closed hydraulic circulating system is provided for supplying power to the cylinder-piston assembly 11, and includes a pump 21, preferably driven by the engine of the vehicle. The fluid is drawn by the pump 21 from a reservoir tank 22, suitably mounted in the chassis of the vehicle. With the control valve 10 in neutral position, later described, the pump 21 is effective to continuously circulate fluid through the valve and thence return the fluid to the tank 22. When actuated in response to manual operation of the steering element of the vehicle, the valve 10 is operatable to divert hydraulic fluid under the pressure of the pump 21 into the power cylinder assembly 11 so as to correspondingly and directly re-position the steered parts of the vehicle.

The composite drag link 18 and control valve 10 assembly comprises a drag link section 23 carrying at its rearward end the socket 24 of the joint 19, accommodating the ball (not shown) of the pitman arm 14. The forward end of the link section 23 is encircled by a collar 25, welded or otherwise secured thereto. The collar is threadedly engaged with one end of the bore of a tubular valve casing 26. The opposite or forward end of the casing 26 receives a socket sleeve 27 having a lateral opening 28 therein for projection of the ball 29 with which the steering arm 20 is equipped. As will appear, the steering arm 20 and ball 29 are permitted a limited range of movement relative to the pitman arm 14.

Within the casing 26 and abutting the collar 25 and sleeve 27, respectively, are a pair of annular valve heads 30 and 31, secured rigidly to opposite ends, respectively, of an intermediate valve cage 32 by screws 33. Thus, the cage 32 is held rigidly with respect to the casing 26, sleeve 27 and link section 23 and moved longitudinally therewith in response to motivation by the pitman arm 14. Similarly clamped between the valve heads 30 and 31 and within the bore of the cage 32 is a ported valve sleeve 34.

Four beveled openings 35, formed in the casing 26 permit extension of a corresponding number of hoses 36, 37, 38 and 39 which are threadedly attached in complementary openings 40 of the valve cage 32. Two of the hoses 36 and 37 are connected to the pump 21 and reservoir 22, respectively, through a bulkhead 41. The other two hoses 38 and 39 are connected through the bulkhead 41 with opposite ends of a cylinder 42 forming a part of the assembly 11. The cylinder 42 is pivotally mounted as at 43 to the axle of the vehicle and incorporates a piston 44 (indicated in dotted lines in Fig. 1). The piston rod 44a is in turn connected by a ball and socket joint 45 to the tie rod 13. It will be appreciated that the introduction of fluid pressure through the hose 38 into the mounted end of the cylinder, with a corresponding relief of pressure in the hose 39, is effective to extend the piston rod and to shift the tie rod, turning the steered parts to the left as seen in Fig. 1. Conversely, the relief of pressure in the hose 38 and complementary increase of pressure in the hose 39 is effective to reverse the direction of movement of the steered parts. The hoses 36, 37, 38 and 39 are in open communication through the threaded openings 40 with transversely aligned annular recesses 46, 47, 48 and 49 formed in the bore of the cage. Also formed in the body of the cage 32 is an inlet passage 50, extending longitudinally therethrough, which communicates the annular inlet recess 46 to an annular recess 51 disposed in the body of the cage 32 between the recesses 48 and 49 with which the hoses 38 and 39 are connected. The annular outlet recess 47, connected with the outlet hose 37, is similarly communicated with another annular recess 52 in the forward end of the bore of the valve cage 32, by an outlet passage 82 formed in the body of the cage for a purpose later described (Fig. 3). Ports 93 in the sleeve register with the recess 52 so as to communicate the bore of the sleeve adjacent ports 80 with the outlet passage 82. Within the bore of the valve sleeve 34 is a relatively reciprocable valve plunger 53, the rearward closed end of which projects slidably into the bore of the adjacent valve head 30 and is sealed therewith throughout the range of relative movement by a ring seal 54. The opposite end of valve plunger 53 is threaded for attachment to the end of a rod 55 which seals the corresponding end of the bore of plunger 53 and projects forwardly through the hub 56 of a ball socket housing 57, relative to which the rod 55 is very slightly telescopically extensible and contractible. A nut 58, threaded on the end of the rod 55 within the bore of the housing 57 limits extension of these parts. The ball socket housing 57 is provided with a lateral opening 59 complementary to the opening 28 in the socket sleeve 27 so as to receive the steering arm 20. Encircling the hub 56 of the socket housing 57 and the rod 55 is a spring seat 60 having an inner annular flange 61 at one end which is loosely confined between the body of the socket housing 57 and a nut 62 threaded on the hub 56. 63 indicates a set screw threaded into the joint between the nut 62 and hub 56 of the socket housing. A helical spring 64 interposed between the spring seat 60 and socket housing 57 maintains the spring seat in contact with the adjacent valve head 31 and the nut 58 in contact with the socket housing 57.

At the opposite end of the socket housing (Fig. 5) the sleeve 27 encloses a second spring seat 65 and a plug 66 threaded into the end of the sleeve. The spring seat 65 slidably encircles a threaded axial boss 67 integral with the plug with which an inner annular flange 68 of the seat 65 is in slidable association. The flange 68 is loosely confined between a nut 69 and the body of the plug 66. A spring 70, identical to the spring 64 encircles the spring seat 65 so as to exert an expansive urge against the plug 66 and urges the spring seat 65 against the adjacent end of the socket housing 57 in opposition to the urge of the spring 64. It will thus be observed that while the socket housing is slightly movable longitudinally relative to the sleeve 27 the springs 64 and 70, being of equal strength normally tend to maintain a neutral position of these parts. However, as the range of such movement is extremely limited, the springs are never fully compressed.

The socket housing 57 encloses a pair of socket elements 71 and 72 adapted for reception therebetween of the ball 29 of the steering arm 20 comprising a part of the linkage by which the steered parts are normally actuated. One element 71 is threaded in the end of the socket housing 57. A helical spring 73 enclosed by a collar 74, fitted in the bore of the socket housing 57 between the base of the latter and the other socket element 72 bears against the back of the last-named element so as to resiliently confine the ball 29 of the steering arm. 75 indicates a grease fitting by which the socket assembly may be lubricated.

The valve plunger 53 is formed with a pair of annular enlargements comprising valves 76 and 77, the former controlling flow through two series of ports 78 and 79 in the valve sleeve 34 registering with the annular recess 48 communicated with the power hose 38, and the second valve 77 correspondingly controlling flow through two series of ports 80 and 81 in the valve sleeve 34 registering with the annular recess 49 communicated with the hose 39. Hydraulic fluid introduced into the control valve 10 through the hose 36 flows through the passage 50 and recess 51 and enters the bore of the valve sleeve 34 through ports 83 located between the annular valves 76 and 77 of the plunger 53. The respective valve enlargements 76 and 77 are slidable with the bore of the valve sleeve 34 and are adapted in response to limited longitudinal relative movement between the valve elements to close and open simultaneously one or the other of a series of ports communicated with the respective annular recesses 48 and 49, as will appear. The annular valves 76 and 77 are of a length and are spaced apart on the plunger a distance proportioned with the spacing of the ports 78, 79, 80 and 81 communicating with the respective hoses 38 and 39 leading to the power cylinder, whereby the valves are normally positioned between the respective pairs of ports which they control. Relative longitudinal movement between the plunger 53 and valve sleeve 34 results in closure of ports 78 and 80 or ports 79 and 81 and the coincident opening of the complementary ports controlled by each valve.

With the valve 10 in neutral position, the return flow of fluid from the valve sleeve 34 to the reservoir 22 is permitted through ports 78 and 79 in the sleeve 34 registering with the annular recess 48 and through the second series of ports 80 and 81 in the sleeve registering with the annular recess 49 with which the end of the passage 82 is in communication. Fluid flowing through the ports 78 and 79 is then directed into the bore of the sleeve to the outlet hose 37 through a series of ports 94 formed in the sleeve registering with the recess 47. Fluid flowing through the ports 81—80 is then directed through the port 93 and thence through the outlet passage 82 to the recess 47 for return to the reservoir tank.

Figure 2:
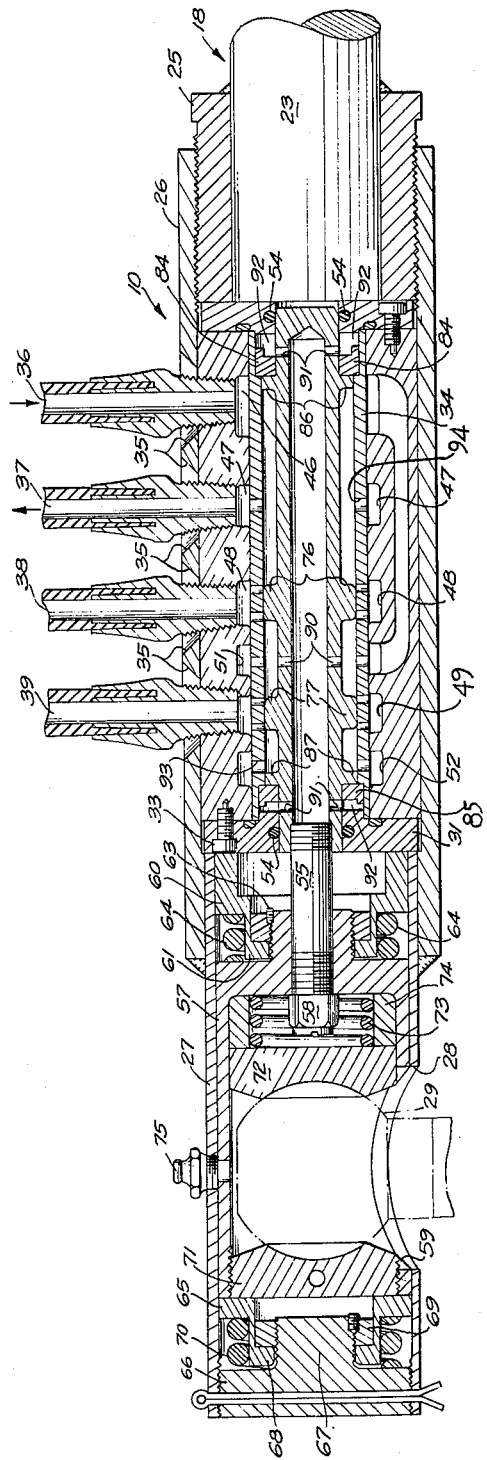
Fig. 2 is a longitudinal section through the control valve assembly showing the elements of the valve in neutral positions.

Each end of the valve sleeve 34 is diametrically enlarged to accommodate pressure slip rings 84 and 85, slidably fitted between the plunger and sleeve. The plunger is formed with a pair of annular enlargements 86 and 87 at opposite ends and with the valve in neutral position as seen in Fig. 2 are flush with the shoulders 88 and 89, respectively, formed by the diametric enlargement of the ends of the sleeve, whereby the ring at each end of the valve is normally adapted to contact both the adjacent enlargement and the shoulder. Pressure fluid is admitted behind the rings so as to normally urge the rings against the shoulders 88 and 89 of the plunger 53 or the enlargements 86 and 87 or both, depending upon the relative longitudinal positions of the valve sleeve and plunger. To this end, the plunger is formed with ports 90 which are in alignment with the ports 83 and recess 51 terminating at the end of the inlet passage 50. Adjacent each of the ends of the valve plunger 53 are a series of ports 91 through which fluid is permitted to flow from the bore of the plunger into the annular chambers 92 in back of the respective slip rings. It will be appreciated that the ports 91 are in open communication with the bore of the valve plunger 53 throughout the range of relative movement between the plunger and sleeve and accordingly, the rings 84 and 85 are, at all times, forced in response to the variable pressure of the pump 21, against either the adjacent shoulders 88—89 of the sleeve or the enlargements 86—87 of the valve plunger, or against both the shoulders and enlargements when the valve is in neutral position. Any relative longitudinal displacement of the valve plunger 53 and sleeve 34 from their neutral relationship, wherein the enlargement and shoulder at each end of these respective parts are in flush relationship, causes the ring at one end of the plunger to bear against the shoulder and simultaneously pressure is relieved upon the shoulder at the opposite end of the unit. Thus, while the equal pressure of the rings 84 and 85 against the respective components of the valve normally tend to oppose and thereby counteract one another, any disturbance of the normal relationship of these valve parts sets up a counteracting force which is variable depending upon the pressure required of the pump in the operation of the unit, tending to return the valve to its neutral position.

The utility and operation of the device is further briefly described as follows: With the pump 21 driven by the engine, fluid will be continuously circulated through the control valve 10 while the engine is running and will maintain a minimum equal pressure within the power cylinder 42 at opposite sides of the piston 44. In accordance with this operation, fluid is directed into the control unit through the hose 36 and corresponding opening 40 in the tubular valve cage 32. The fluid thence passes through the inlet passage 50 through port 83 and into the bore of the sleeve 34 between the valve enlargements 76 and 77 of the plunger 53. The fluid under the pressure of the pump 21 thus fills the bore of the valve plunger and the chambers 92 in back of the respective pressure rings 84 and 85. As above indicated, the rings thus continuously function to urge the valve sleeve 34 and plunger 53 into a neutral relationship wherein the shoulders 88 and 89 of the sleeve are flush with the complementary surfaces of the enlargements 86 and 87 at the end of the plunger 53. In such neutral position of the valve, as will obtain when no tortional stress is applied to either the steering or the steered parts of the vehicle, the valves 76 and 77 are disposed intermediate the ports 78—79 and 80—81 which they control, respectively. Thus the opposite ends of the power cylinder 42 are in open communication through the hoses 38 and 39 with the bore of the valve sleeve 34 between the valves 76 and 77 and the pressure within the cylinder at opposite sides of the piston 44 therein is equally maintained. With the valve 10 in its neutral position, as described, the fluid circulates through the series of ports 78 and 81 into the annular recesses 48 and 49 and thence returns to the bore of the sleeve 34 through the adjacent series of ports 79 and 80. Fluid flowing through the ports 80 enters the outlet passage 82 through the ports 93 in the sleeve 34 and thence returns to the reservoir through hose 38. Correspondingly, fluid returning to the bore of the sleeve 34 through ports 79 flows through the port 94 in the sleeve into hose 38 and thence to the reservoir.

Should the driver desire to change the direction of movement of the vehicle, the steering wheel is turned in a conventional manner which is operable to swing the pitman arm 14 in one direction or the other. If, for example, the steering wheel is turned in a counter-clockwise direction the arm 14 is swung forwardly so as to correspondingly advance the drag link section 23 (see Fig. 4). This movement is transmitted through the valve cage 32 and valve head 31 to the spring 64 interposed between the seat 60 and socket housing 57. Corresponding forward movement of the socket housing is resisted by the friction of the steered wheels with the roadbed and accordingly, the spring 64 is compressed very slightly bringing the spring seat 60 into abutting relationship with the socket housing, as indicated in Fig. 1. The valve plunger 53 is momentarily held stationary while the valve sleeve 34 is shifted forwardly with the drag link section 23. The port 79 and port 81 are thereby closed while the ports 78 and 80, normally partially restricted, by the respective valves 76 and 77 are opened more fully. Pressure fluid is thus diverted from the ports 81 and is directed into the hose 38 leading to the mounted end of the power cylinder 42. Coincidentally, pressure at the opposite side of the piston 44 is relieved through the hose 39, ports 80, port 93 and the outlet passage 82 connected to the reservoir 22 by the hose 37. The piston 44 is thus advanced so as to mechanically impel the turning of the steered wheels, directing the vehicle to the left, in conformance with the direction of manual actuation of the steering wheel.

Figure 5:
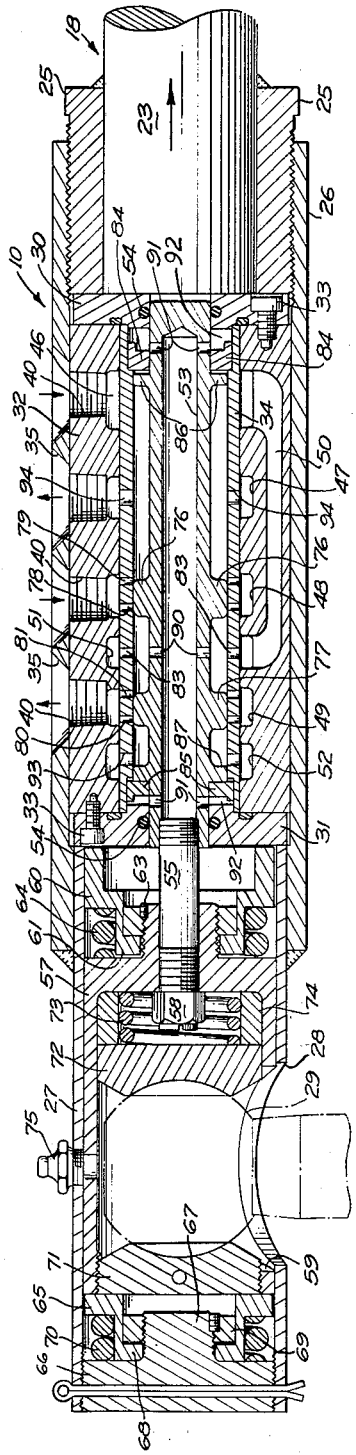
Fig. 5 is a longitudinal sectional view through the control valve presenting the parts in their relative positions which are assumed as a result of the application of an actuating force in a direction opposite from that depicted in Fig. 4.

The adjustment of the control valve 10 incident to clockwise motion of the steering wheel is illustrated in Fig. 5. As indicated, by the arrows, fluid under pressure is directed through the opening 40 in the valve cake 32, through ports 81 and the hose 39 and into the mounted end of the power cylinder 42 while pressure is relieved from the opposite side of the piston 44 through the hose 38, thereby turning the steered wheels to the right.

It will be noted that in the event of a failure of the hydraulic system the steered parts may be actuated manually in the usual manner. The slight telescopic contraction or extension of the drag link mechanism essential to the actuation of the control valve 10, being unnoticeable to the driver and resulting in no material delay in effecting transmission of the movement of the steering wheel to the steered elements.

In accordance with the operation of the control unit as above-described, the steered parts will continue to turn in the direction impelled by the piston-cylinder assembly as long as sufficient torque is applied to the steering wheel to maintain the valve plunger 53 in an out-of-neutral relationship with the valve sleeve 34. However, as the hydraulic power is applied, the piston 44 of the power cylinder again extends or contracts the drag link in opposition to the initial urge in the pitman arm 14 and thus promptly returns all parts of the valve to neutral positions.

Accordingly, with the opposite ends of the cylinder 42 in open communication with the reservoir tank 22 the natural caster of the steered wheels will induce the wheels to again assume a forward, straight-line relationship with the vehicle as the steering wheel is returned to its normal position, without the application of hydraulic power.

An important feature of the present invention resides in the back pressure created in the control valve and applied to the pitman arm 14 by the pressure rings 84 and 85 which transmit to the steering wheel a resistance to turning which is less than, but at all times proportionate to, the resistance to directional variation encountered by the vehicle wheels. This proportionate resistance may thus be felt by the driver through the steering wheel so as to facilitate a more prompt response to his own requirements and thereby facilitate better handling of the vehicle without imposing any strain upon the driver greater than that required to operate the control valve.

It will be appreciated that while I have shown a preferred embodiment of my invention, numerous changes in size, design, shape, number and proportion of the various parts may be made, and more specifically that the slip rings 84 and 85 may be increased or decreased in size to present a correspondingly greater or lesser cross-sectional area to the pressure of the pump and thereby modify the magnitude of the resistance to activation of the control unit in proportion to the resistance to turning of the steered elements, that the power cylinder may be connected to any of the linkage intermediate the drag link and wheels or directly to a steered part, and that any means may be substituted for the steering wheel-pitman arm assembly to effect the longitudinal movement of the drag link which is essential to the operation of the valve mechanism—all without departing from the spirit of my invention as defined by the appended claims.

What I claim and desire to secure by Letters Patent is:

1. In a steering booster for a vehicle having a steered part, a fluid motor comprising a piston and cylinder, means to connect said motor to the steered part to actuate the latter, a source of fluid under pressure, means of communication between said source of fluid under pressure and said fluid motor, a control valve interposed in said means of communication comprising a pair of telescopically-related elements operable in response to relative telescopic movement from relative neutral positions to vary the flow of fluid from said source to said motor, means to actuate said control valve, and means to direct and transmit fluid pressure from said source against said elements of said valve to resist telescopic displacement of the same from said relative neutral positions.

2. In a steering booster for a vehicle having a steered part, a fluid motor comprising a piston and a cylinder, means to connect said motor to the steered part to actuate the latter, a source of fluid under pressure, means of communication between said source of fluid under pressure and said fluid motor, a control valve interposed in said means of communication comprising a pair of telescopically-related elements operable in response to relative telescopic movement to control the flow of fluid from said source to said motor, means to actuate said control valve, and means comprising a ring forming a part of said valve to transmit fluid pressure from said source against complementary surfaces of said valve elements to resist telescopic displacement of said elements from predetermined relative positions of the latter incident to activation of said actuating means.

3. In a steering booster for a vehicle having a steered part, a fluid motor comprising a piston and a cylinder, means to connect said motor to the steered part to actuate the latter, a source of fluid under pressure, means of communication between said source of fluid under pressure and said fluid motor, a control valve interposed in said means of communication comprising a pair of telescopically-related elements operable in response to relative telescopic movement to control the flow of fluid from said source to said motor, means to actuate said control valve, said valve elements having a pair of shoulders flush with one another when said valve is in a telescopically neutral, inoperative position, and means actuated by fluid pressure from said source to bear against said shoulders with equal pressure to resist longitudinal displacement of said elements with respect to one another.

4. In a steering booster for a vehicle having a steered part, a fluid motor comprising a piston and a cylinder, means to connect said motor to the steered part to actuate the latter, a source of fluid under pressure, means of communication between said source of fluid under pressure and said fluid motor, a control valve interposed in said means of communication comprising a pair of telescopically-related elements operable in response to relative telescopic movement to control the flow of fluid from said source to said motor, means to actuate said control valve, said valve elements forming a pair of annular shoulders disposed in offset relation when said valve is in a telescopically operative position, a slip ring encircling one of said elements to bear against one of said shoulders to urge said valve elements toward a neutral position in which said shoulders are flush with one another.

5. A booster for a vehicle having a steering arm-steered part assembly and manually-actuated pitman arm, a fluid motor connected to said assembly to actuate said steered part, pump mechanism to supply pressure to said fluid motor to actuate the same in accordance with correspondingly varying load requirements, means of communication between said pump mechanism and said fluid motor, a drag link connected between said pitman arm and said first-named assembly, a control valve forming a part of said drag link and comprising a pair of telescopically-related valve elements for controlling the flow between said pump mechanism and said motor in response to telescopic adjustment of said elements, and means to resist telescopic adjustment of said valve elements, actuated in response to fluid pressure from said source proportionate to but less than the pressure required to actuate said motor.

6. In a steering booster for a vehicle comprising a pair of steered parts connected by a tie rod actuated by a steering arm, a fluid motor comprising a cylinder and a piston connected to said tie rod to actuate said steered parts, a source of fluid under pressure, means of communication between said source of pressure and said fluid motor, means comprising a drag link connected to said steering arm to actuate the same, said drag link comprising a pair of telescopically related valve elements forming a valve interposed in, and operable to control the flow through, said means of communication, resilient means forming a part of said valve to urge said valve elements toward neutral positions, and means actuated by fluid pressure from said source to exert a variable force in urging said valve elements toward neutral positions.

7. In a steering booster having a steered part and a manually operable drag link, a fluid motor comprising a piston and cylinder, means to connect said motor to said steered part to actuate the latter, a pump to supply fluid under pressure, means of communication between said pump and said fluid motor, a control valve comprising a pair of telescopically-related valve elements carried by said drag link, said valve being interposed in said means of communication to control the flow of said pressure fluid to said motor incident to telescopic adjustment of said valve elements, a ring encircling one of said valve elements and normally bearing against each of said valve elements, and means to direct pressure of said pump against said ring whereby the latter is operable to produce a resistance to telescopic actuation of said valve proportionate to the load imposed upon said motor.

8. In a steering booster having a steered part and a manually operable drag link, a fluid motor comprising a piston and cylinder, means to connect said motor to said steered part to actuate the latter, a pump to supply fluid under pressure, means of communication between said pump and said fluid motor, a control valve comprising a pair of telescopically-related valve elements carried by said drag link, said valve being interposed in said means of communication to control the flow of said pressure fluid to said motor incident to telescopic adjustment of said valve elements, a ring encircling one of said valve elements and normally bearing against each of said valve elements, means to direct pressure of said pump against said ring whereby the latter is operable to produce a resistance to telescopic actuation of said valve proportionate to the load imposed upon said motor, and resilient means to resist telescopic displacement of said valve elements from a predetermined relationship.

9. In a steering booster for a vehicle comprising a pair of steered parts connected by a tie rod actuated by a steering arm, a fluid motor comprising a cylinder and a piston connected to said tie rod to actuate said steered parts, a source of fluid under pressure, means of communication between said source of pressure and said fluid motor, means comprising a drag link connected to said steering arm to actuate the same, said drag link including a pair of telescopically-related valve elements comprising a valve interposed in, and operable to control the flow through, said means of communication, and means actuated by fluid pressure from said source to exert a force operable to move said valve elements toward relative neutral positions.

ROBERT A. GARRISON.

REFERENCES CITED

The following references are of record in the file of this patent:

UNITED STATES PATENTS

| Number | Name | Date |
|---|---|---|
| 1,647,404 | Gehrig | Nov. 1, 1927 |
| 2,022,698 | Vickers | Dec. 3, 1935 |
| 2,450,126 | Fischer | Sept. 28, 1948 |
| 2,487,613 | Twyman | Nov. 8, 1949 |